(12) United States Patent
Zimmerman

(10) Patent No.: US 9,927,525 B2
(45) Date of Patent: Mar. 27, 2018

(54) GOLF BALL LOCATING SYSTEM

(71) Applicant: Scott Zimmerman, Keswick (CA)

(72) Inventor: Scott Zimmerman, Keswick (CA)

( * ) Notice: Subject to any disclaimer, the term of this patent is extended or adjusted under 35 U.S.C. 154(b) by 353 days.

(21) Appl. No.: 14/444,239

(22) Filed: Jul. 28, 2014

(65) Prior Publication Data

US 2015/0094167 A1 Apr. 2, 2015

Related U.S. Application Data

(60) Provisional application No. 61/885,234, filed on Oct. 1, 2013.

(51) Int. Cl.
*G01S 19/19* (2010.01)
*G01S 19/00* (2010.01)

(52) U.S. Cl.
CPC ................ *G01S 19/19* (2013.01)

(58) Field of Classification Search
CPC .......... G01S 19/01; G01S 19/13; G01S 19/14; G01S 19/19; A63B 24/0021
See application file for complete search history.

(56) References Cited

U.S. PATENT DOCUMENTS

| | | | | |
|---|---|---|---|---|
| 5,423,549 A * | 6/1995 | Englmeier | ......... | A63B 24/0021 473/353 |
| 5,434,789 A * | 7/1995 | Fraker | ................ | A63B 24/0021 473/407 |
| 6,456,938 B1 * | 9/2002 | Barnard | .................. | G01S 19/19 340/990 |
| 6,524,199 B2 * | 2/2003 | Goldman | ............ | A63B 24/0021 342/450 |
| 6,908,404 B1 * | 6/2005 | Gard | .................. | A63B 24/0021 473/353 |
| 6,998,965 B1 | 2/2006 | Luciano, Jr. et al. | | |
| 7,095,312 B2 * | 8/2006 | Erario | ................ | A63B 24/0021 340/323 R |
| 8,257,189 B2 | 9/2012 | Koudele et al. | | |

(Continued)

OTHER PUBLICATIONS

G. C. Southworth, "Radio Antennas," p. 7-57 of the book, "Electrical Engineers' Handbook"; vol. V; Third Edition Rewritten; Harold Pender and Knox McIlwain, editors; John Wiley and Sons, Inc,; New York, NY, USA; 1936.*

(Continued)

*Primary Examiner* — Bernarr E Gregory
(74) *Attorney, Agent, or Firm* — Global Intellectual Property Agency, LLC; Jordan Sworen

(57) ABSTRACT

Disclosed is a golf ball locating system that includes a golf ball having a control circuit therein. The control circuit includes a global positioning system (GPS) chip, a radio frequency transmitter, one or more antennas, and a rechargeable battery. The golf ball is capable of transmitting a signal to a smartphone or similar mobile electronic device having a related software application thereon. The software application indicates the position of the golf ball relative to the user. The software application preferably displays a map of the golf course, and indicates the position of the ball on the course. As the user approaches the golf ball, the mobile electronic device will produce an audible alert, such as a tone, with increasing frequency as the golfer nears his or her golf ball. In this way, a user can easily locate his or her golf ball while golfing.

10 Claims, 2 Drawing Sheets

(56) References Cited

U.S. PATENT DOCUMENTS

| | | |
|---|---|---|
| 8,400,346 B2 | 3/2013 | Hubbard et al. |
| 2005/0164808 A1 | 7/2005 | Sasaki |
| 2006/0105857 A1* | 5/2006 | Stark ................. A63B 24/0021 473/353 |
| 2010/0151955 A1 | 6/2010 | Holden |
| 2014/0128171 A1* | 5/2014 | Anderson ............... G01S 19/19 473/199 |

OTHER PUBLICATIONS

GPS Golf App. Oct. 20, 2017.

* cited by examiner

GOLF BALL LOCATING SYSTEM

CROSS REFERENCE TO RELATED APPLICATION

This application claims the benefit of U.S. Provisional Application No. 61/885,234 filed on Oct. 1, 2013, entitled "GPS/RF Golf Ball." The above identified patent application is herein incorporated by reference in its entirety to provide continuity of disclosure.

BACKGROUND OF THE INVENTION

Field of the Invention

The present invention relates to golf ball locating systems. More specifically, the present invention relates to a golf ball having a global positioning system (GPS) locator, a radio frequency (RF) transmitter, and a rechargeable battery positioned therein. The GPS and RF transmitter work cooperatively in order to identify the golf ball's location, and the location is transmitted to a smartphone or other mobile electronic device, which includes a related software application that displays a map of the golf hole and the location of the golf ball thereon.

Golfers, beginners and professionals alike, often spend considerable time looking for their golf ball after taking a stroke. A golf ball may be difficult to find when the player hits the golf ball into a hazard on the course such as water hazards, sand traps, tall grass, and wooded areas. However, even properly struck balls may be difficult to find if the user loses track of the golf ball in flight, or if the golfer is playing in low light conditions. Further, leaves and other such debris on the golf course may make it difficult for a player to locate his or her golf ball. When a user cannot find his or her golf ball after taking a stroke, the player must spend considerable time looking for the golf ball, or the player must take a penalty stroke and drop a new golf ball to play. Moreover, the user may simply give up looking for the golf ball, causing the player to lose his or her golf ball.

Taking the time to look for a lost or mishit golf ball can be frustrating for the golfer, and may diminish the golfer's enjoyment of the game. Further, searching for a golf ball slows down the round of golf, which is inconvenient for the golfer, and for other golfers on the course. Slow play causes golf courses to become crowded, and other groups of golfers may have to wait to play a hole until the group ahead of them finishes searching for a ball and completing the hole. Further, slow play also negatively impacts the profits that the golf course owners can reap from their course since only a limited number of players can be on the course at any given time.

The present invention provides a golf ball locating system comprising a golf ball having a control circuit therein. The control circuit comprises a GPS chip, an RF transmitter, one or more antennas, and a rechargeable battery. The GPS chip is adapted to determine the location of the golf ball, and the location information can be wirelessly transmitted to a mobile electronic device, such as a smartphone, having a related software application thereon. The software application is adapted to display the location of the golf ball, and preferably displays a map of the golf course. The golf ball includes a rechargeable battery that can be charged inductively when placed on an inductive charging station. Further, the golf ball includes an RF transmitter adapted to send signals to the mobile electronic device. As the user's proximity to the golf ball increases, the mobile electronic device is adapted to produce audible signals of increasing frequency to indicate to the user that the user is nearing his or her golf ball. Thus, the present invention allows a user to more easily locate a golf ball on a golf course.

Description of the Prior Art

Devices have been disclosed in the prior art that relate to golf ball locating systems. These include devices that have been patented and published in patent application publications. These devices generally relate to systems for locating golf balls that detect the location of the golf ball. The following is a list of devices deemed most relevant to the present disclosure, which are herein described for the purposes of highlighting and differentiating the unique aspects of the present invention, and further highlighting the drawbacks existing in the prior art.

One such device, U.S. Patent Application Publication Number 2010/0151955 to Holden discloses a system and method for positioning a transmitter in various objects, such as a golf ball, wherein the transmitter becomes active when the object is in motion. The transmitter can use GPS information or can use an RF signal in order to relay the position of the object to the receiver. The transmitter is adapted to send a signal to a receiver in order to allow a user to determine the location of the object. The receiver may output the location of the object on a display. Thus, Holden fails to disclose a golf ball locating system including a software application on a mobile electronic device that shows the location of a golf ball, and wherein the device outputs an audible signal that increases in frequency as the user approaches his or her golf ball on the golf course.

Another device, U.S. Patent Application Publication Number 2005/0164808 to Sasaki describes a golf ball having an IC chip that can input or output data regarding the golf ball's manufacture history, shot history, and flight properties. Such information can be used to facilitate ball quality control, ball recycling, and evaluating of flight performance. Thus, Sasaki does not disclose a golf ball that helps a user to determine the location of the golf ball after it has been struck, and instead Sasaki discloses a golf ball that keeps track of information regarding the operation and properties of the golf ball.

U.S. Pat. No. 6,998,965 to Luciano, Jr. et al. discloses a golf range target and system. The target is movable to a desired location and comprises a surface that guides a golf ball that strikes the target towards a receiver. The receiver has an RFID reader and a GPS receiver, which reads the golf ball ID and sends the info and GPS data to a server. In this way, golfers hitting golf balls on the range can receive real time feedback as to their performance on the range. Thus, Luciano, Jr. discloses a target having an RFID reader and a GPS receiver that detects a golf ball hit into the target area, and Luciano fails to disclose a golf ball having an integrated GPS device and RF transmitter.

U.S. Pat. No. 8,400,346 to Hubbard et al. discloses a method for locating a golf ball wherein a radar signal is transmitted into a target area, and the reflected portions of the signal are processed. The processing step involves windowing analog signals and obtaining a fast Fourier transform for each window in order to determine whether the average of the fast Fourier transform results indicates that a golf ball is present in the target area. Thus, Hubbard et al. discloses a method of using Doppler radar to determine the location of a golf ball, and does not disclose the use of a transmitter integrated into a golf ball that transmits a signal regarding the golf ball's location.

Finally, U.S. Pat. No. 8,257,189 to Koudele et al. discloses a method for monitoring a golf ball that utilizes a differential time locating technique. The method is directed to characterize the movement of a golf ball on a golf range. In one embodiment, the golf ball transmits a signal from a landing location wherein transceivers are distributed across the range. Thus, Koudele does not describe a golf ball having an integrated GPS chip and RF transmitter used to help a golfer locate the position of a golf ball on a golf course by sending the locating information to the golfer's smartphone or mobile electronic device.

These prior art devices have several known drawbacks. Several devices in the prior art disclose the installation of various types of receivers in a golf range or similar area so that the receivers detect whether a golf ball has been struck in that location. Thus, such devices help a user on a driving range determine how far the ball was struck, but these devices require the distribution of receivers throughout an area, which is impractical for use on a golf course.

In light of the devices disclosed in the prior art, it is submitted that the present invention substantially diverges in design elements from the prior art and consequently it is clear that there is a need in the art for an improvement to existing golf ball locating systems. In this regard the instant invention substantially fulfills these needs.

SUMMARY OF THE INVENTION

In view of the foregoing disadvantages inherent in the known types of golf ball locating systems now present in the prior art, the present invention provides a new golf ball locating system wherein the same can be utilized for providing convenience for the user when playing golf and locating the user's ball after each stroke.

It is therefore an object of the present invention to provide a new and improved golf ball locating device that has all of the advantages of the prior art and none of the disadvantages.

It is another object of the present invention to provide a golf ball locating system comprising a golf ball that wirelessly transmits its location to a software application installed on a user's smartphone or similar mobile electronic device.

Another object of the present invention is to provide a golf ball locating system comprising a golf ball having an integrated GPS chip and RF transmitter.

Yet another object of the present invention is to provide a golf ball locating system comprising a golf ball having a rechargeable battery that can be charged by induction.

Another object of the present invention is to provide a golf ball locating system that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
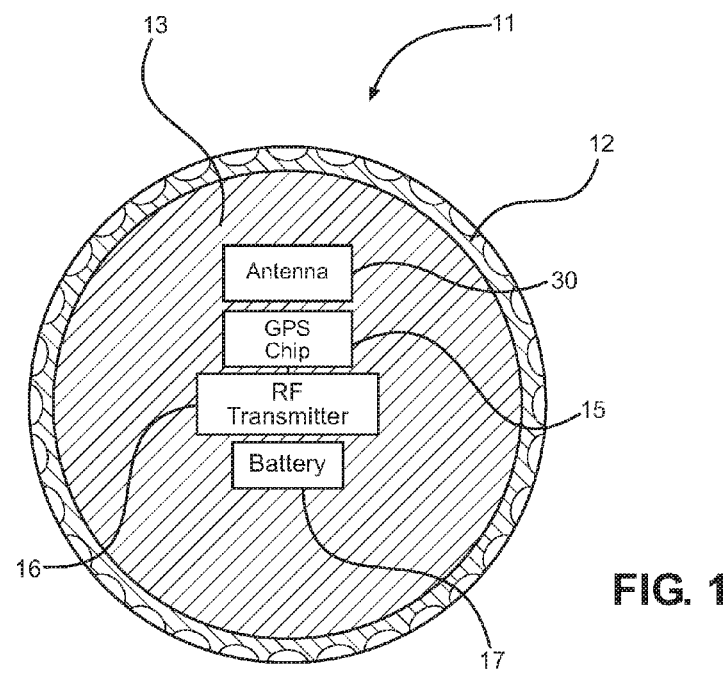
FIG. 1 shows a cross-sectional view of the golf ball of the present invention.

Reference is made herein to the attached drawings. Like reference numerals are used throughout the drawings to depict like or similar elements of the golf ball locating system. For the purposes of presenting a brief and clear description of the present invention, the preferred embodiment will be discussed as used for locating a golf ball on a golf course and transmitting the location to the golfer. The figures are intended for representative purposes only and should not be considered to be limiting in any respect.

Referring now to FIG. 1, there is shown a cross sectional view of the golf ball of the present invention. The golf ball 11 of the present invention is substantially spherical and includes an outer shell 12 defining an interior volume. The outer shell 12 has a plurality of circular dimples on the exterior surface thereof to improve the aerodynamics of the golf ball 11 while in flight. The dimples can be arranged in any of a variety of patterns. Thus, the outer shell 12 resembles a traditional golf ball and is composed of materials commonly used to construct golf balls, wherein the material is durable and cut-proof.

The interior volume includes at least one interior layer 13. The interior layer 13 is composed of any suitable material used to fill golf balls, including synthetic rubber or resin, among others. The interior layer 13 substantially fills the interior volume of the golf ball 11. The interior volume of the golf ball 11 further comprises a control circuit comprising a GPS chip 15, a wireless signal transmitter such as an RF transmitter 16, and a rechargeable battery 17. The control circuit may further include one or more antennas adapted to facilitate signal transmission. The golf ball 11 is constructed so that the control circuit does not significantly impact the weight or weight distribution of the golf ball 11. Thus, the golf ball 11 of the present invention is of similar weight to conventional golf balls.

The GPS chip 15 is adapted to determine the location of the golf ball 11. The location information determined by the GPS chip 15 can be wirelessly transmitted to the user's mobile electronic device, or otherwise received by the mobile electronic device, by means of the wireless transmitter 16. A related software application on a mobile electronic device can be used to display the location of the golf ball as determined by the GPS chip 15 on a map of the golf course. In this way, the user can visualize the location of the golf ball on the golf course.

Even though the display of the user's mobile electronic device displays the location of the golf ball, the user may still have trouble spotting the ball with his or her unaided eye due to various environmental obstacles. Thus, the present invention further includes a wireless signal transmitter, such as an RF transmitter 16, adapted to send signals to the user's mobile electronic device. The software application will produce an audible alert, such as a tone, that increases in frequency as the user approaches his or her golf ball. Thus, as the user draws near his or her golf ball, the tone will sound more rapidly. This helps a user to locate a golf ball that has landed in a hazard that obstructs the user's vision, such as a wooded area or tall grass.

The rechargeable battery 17 within the golf ball is adapted to be charged inductively. In this way, the battery 17 positioned within the golf ball 11 can be charged, despite being permanently sealed within the golf ball 11. The golf ball 11 can be positioned on an inductive charging station so as to charge the battery 17 therein.

Figure 2:
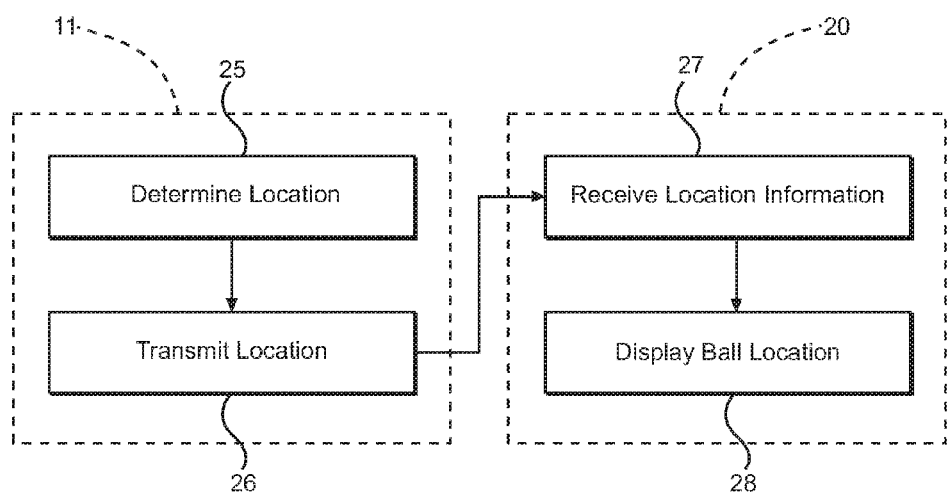
FIG. 2 shows a flow diagram of the operation of the present invention.

Referring now to FIG. 2, there is shown a flow diagram of the operation of the golf ball locating system of the present invention. A golf ball 11 is provided that comprises a GPS chip, an RF transmitter, and a rechargeable battery. In operation, the golfer hits the golf ball 11 and the GPS chip therein determines the location 25 of the golf ball 11. The location of the golf ball 11 is then transmitted 26 to the golfer's mobile electronic device 20, such as a smartphone, tablet, or other similar device, by means of the RF transmitter within the golf ball. The mobile electronic device 20 receives the location information 27 and outputs the location of the golf ball on a display 28.

Figure 3:
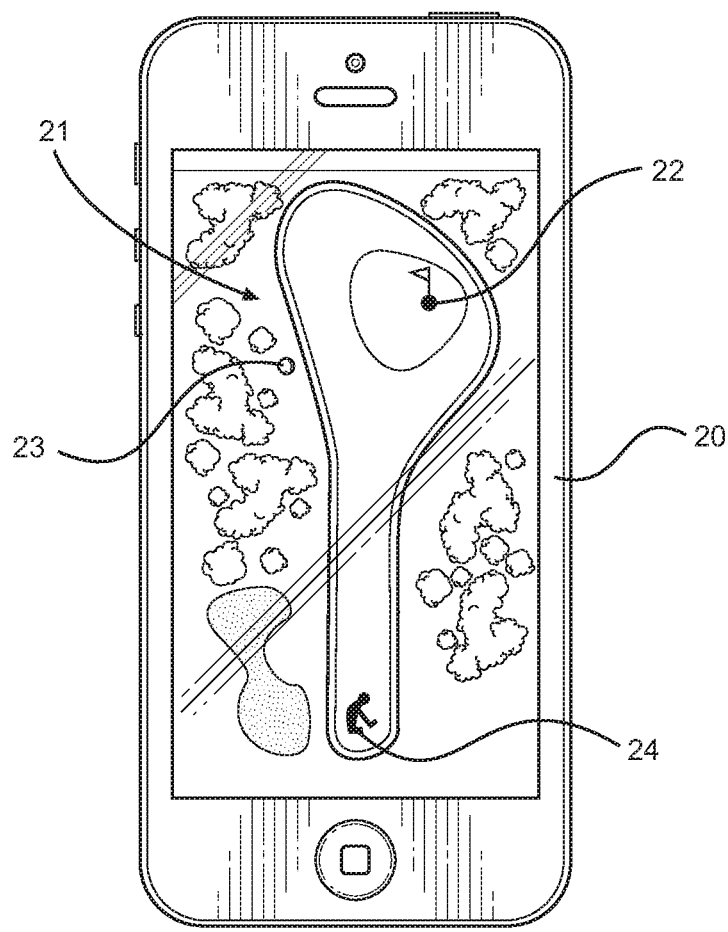
FIG. 3 shows an embodiment of the graphical user interface of the software application displaying a golf course.

Referring now to FIG. 3, there is shown an embodiment of the graphical user interface of the software application showing a golf course. A software application is provided that can be uploaded or installed on a user's mobile electronic device 20. The software application includes a graphical user interface (GUI) 21 that allows the user to visualize the location of a golf ball 23, the golfer's position 24, the layout of a particular hole on a golf course, and the position of the pin 22 on a particular hole. Thus, the GUI 21 may include maps of the various holes on a golf course and of the obstacles thereon. The map 21 preferably includes the location of the pin 22 on each hole so that a golfer can determine his or her location with respect to the pin 22 and with respect to the golf ball location 23. The location of the smartphone, and thus the golfer's location 24, is displayed on the map 21. Thus, the software application allows a user to more easily find his or her golf ball on the golf course.

The GUI 21 further includes input options that allow a user to navigate and control the software. Once the golf ball is struck, the golfer can refer to the mobile electronic device 20 and the software thereon, which displays the golf ball location 23 on a map of the golf course 21 in order to help the golfer locate his or her golf ball. The user can then elect to have the mobile electronic device 20 produce an audible sound, such as a tone, that increases in frequency as the user nears the golf ball. The RF transmitter within the golf ball sends signals to the electronic device indicating the distance of the mobile electronic device from the golf ball. Thus, the tone will sound rapidly when the user draws near the golf ball. The mobile electronic device may be adapted to detect the strength of the signal to determine the proximity of the user and mobile electronic device to the golf ball. Alternatively, the mobile electronic device may determine the distance between the mobile electronic device and the golf ball, and produce a tone of increasing frequency as that distance decreases. Once the user has found his or her golf ball, the user may then use the GUI 21 to turn off the audible alert. This prevents the audible alert from continuing to sound after the golf ball has been located.

In some embodiments of the present invention, the software application may further be adapted to provide golf club suggestions to the user based on the location of the golf ball. The software determines the distance between the location of the user's golf ball and the location of the pin, referred to as the distance to the pin. Once the distance to the pin is known, the software displays a club suggestion to the user. Prior to playing a round of golf, the golfer can input into the software the average distance the golfer strikes a golf ball using a particular club. Thus, the software application can select a golf club having an average distance similar to the distance to the pin.

Further, the software application may allow a user to input additional information to improve the usefulness of the software application's club suggestion. The software application allows a user to input the direction and strength of the wind. Alternatively, the GPS chip may be adapted to determine weather information so that the user is not required to input such information. Further, the software application allows a user to input the lie of the golf ball, such as whether the golf ball is in tall grass or sand. In such cases, the software application recommends that the golfer use a club that has a greater average distance than the distance to the pin, in order to compensate for the effect of the tall grass on the golfer's stroke. Additionally, when the golfer inputs that the golf ball is in sand, the software may instead suggest using a lofted club, or a club with a wide angled club face.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A golf ball locating system, comprising:
a golf ball comprising a control circuit having a GPS chip, a wireless signal transmitter, and a rechargeable battery;
wherein said GPS chip is adapted to determine a location of said golf ball;
wherein said wireless signal transmitter is adapted to send a signal to a mobile electronic device and is further adapted to communicate said location of said golf ball to said mobile electronic device;
wherein said mobile electronic device is adapted to display a map of a golf course and display said location of said golf ball thereon;
a position of said mobile electronic device displayed on said map of said golf course;
a software application installed on the mobile electronic device configured to perform the steps comprising:
utilizing said golf ball comprising said control circuit;
determining said location of said golf ball by means of said GPS chip;
transmitting said location of said golf ball to said mobile electronic device by means of said wireless signal transmitter;
displaying said map of a golf course on said mobile electronic device;

displaying said location of said golf ball on said map of said golf course;

displaying a location of a pin of a golf hole on said map of said golf course;

determining a distance between said location of said golf ball and said location of said pin;

suggesting a golf club for a user to use based on said distance between said location of said golf ball and said location of said pin.

2. The golf ball locating system of claim 1, wherein said rechargeable battery is adapted to be charged inductively on an inductive charging device.

3. The golf ball locating system of claim 1, wherein said wireless signal transmitter is a radio frequency transmitter.

4. The golf ball locating system of claim 1, wherein said golf ball comprises an outer shell defining an interior volume, wherein said interior volume comprises an interior layer.

5. The golf ball locating system of claim 1, wherein said control circuit further comprises one or more antennas.

6. A method of locating a golf ball, comprising the steps of:

utilizing a golf ball comprising a control circuit having a GPS chip, a wireless signal transmitter, and a rechargeable battery therein;

determining a location of said golf ball by means of said GPS chip;

transmitting said location of said golf ball to a mobile electronic device by means of said wireless signal transmitter;

displaying a map of a golf course on said mobile electronic device;

displaying said location of said golf ball on said map of said golf course;

displaying a location of a pin of a golf hole on said map of said golf course;

determining a distance between said location of said golf ball and said location of said pin;

suggesting a golf club for a user to use based on said distance between said location of said golf ball and said location of said pin.

7. The method of claim 6, further comprising the step of:

displaying a location of said mobile electronic device on said map of said golf course.

8. The method of claim 6, further comprising the step of:

producing an audible tone by means of said mobile electronic device that increases in frequency as said mobile electronic device is moved towards said location of said golf ball.

9. The method of claim 6, wherein said control circuit further comprises one or more antennas.

10. The method of claim 6, further comprising the step of:

receiving a direction and strength of wind conditions as a variable when suggesting a golf club.

* * * * *